United States Patent [19]

Slat et al.

[11] Patent Number: 5,246,148
[45] Date of Patent: Sep. 21, 1993

[54] DISPENSING CLOSURE ASSEMBLY FOR PLASTIC BLOW MOLDED CONTAINER

[75] Inventors: William A. Slat, Brooklyn, Mich.; Richard C. Darr, Seville, Ohio

[73] Assignee: Plastipak Packaging, Inc., Plymouth, Mich.

[21] Appl. No.: 933,334

[22] Filed: Aug. 21, 1992

[51] Int. Cl.⁵ .............................. G01F 11/26
[52] U.S. Cl. ........................ 222/454; 215/227
[58] Field of Search ......... 222/424, 454, 549; 53/320; 215/218, 227

[56] References Cited

U.S. PATENT DOCUMENTS

| | | | |
|---|---|---|---|
| 3,917,129 | 11/1975 | Cavazza | 222/454 |
| 4,349,056 | 9/1982 | Heino . | |
| 4,550,862 | 11/1985 | Barker et al. . | |
| 4,640,855 | 2/1987 | St. Clair . | |
| 4,981,239 | 1/1991 | Cappel et al. . | |

FOREIGN PATENT DOCUMENTS 1792  1/1890  Switzerland .................. 222/454

Primary Examiner—Jesûs D. Sotelo
Attorney, Agent, or Firm—Brooks & Kushman

[57] ABSTRACT

A dispensing closure assembly (14) for use with a plastic blow molded container (12) is disclosed as including a dispensing member (20) that is adapted to be fixedly mounted on an upper open end (18) of the blow molded container and also includes a closure member (22) rotatably mounted on the dispensing member for movement between fill and dispensing positions. Dispensing member (20) and closure member (22) of the closure assembly each have an associated fill opening (26, 28) that are aligned in the fill position to fill the interior (24) of the closure assembly upon inversion of the container, and the fill openings are unaligned with each other in the dispensing position to close the upper open end of the container. Dispensing member (20) and closure member (22) also each have an associated dispensing opening (32, 34) that are unaligned in the fill position so the liquid contents received from the container then remain within the interior (24) of the closure assembly, and the dispensing openings are aligned with each other in the dispensing position of the closure member to permit dispensing of liquid contents within the closure assembly.

7 Claims, 2 Drawing Sheets

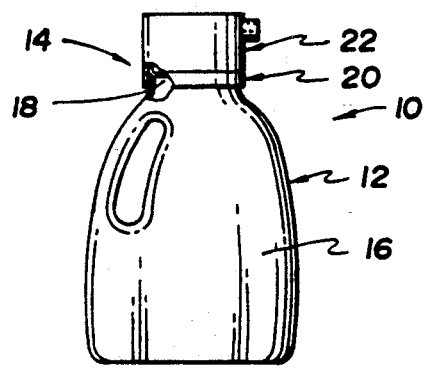
Fig. 1
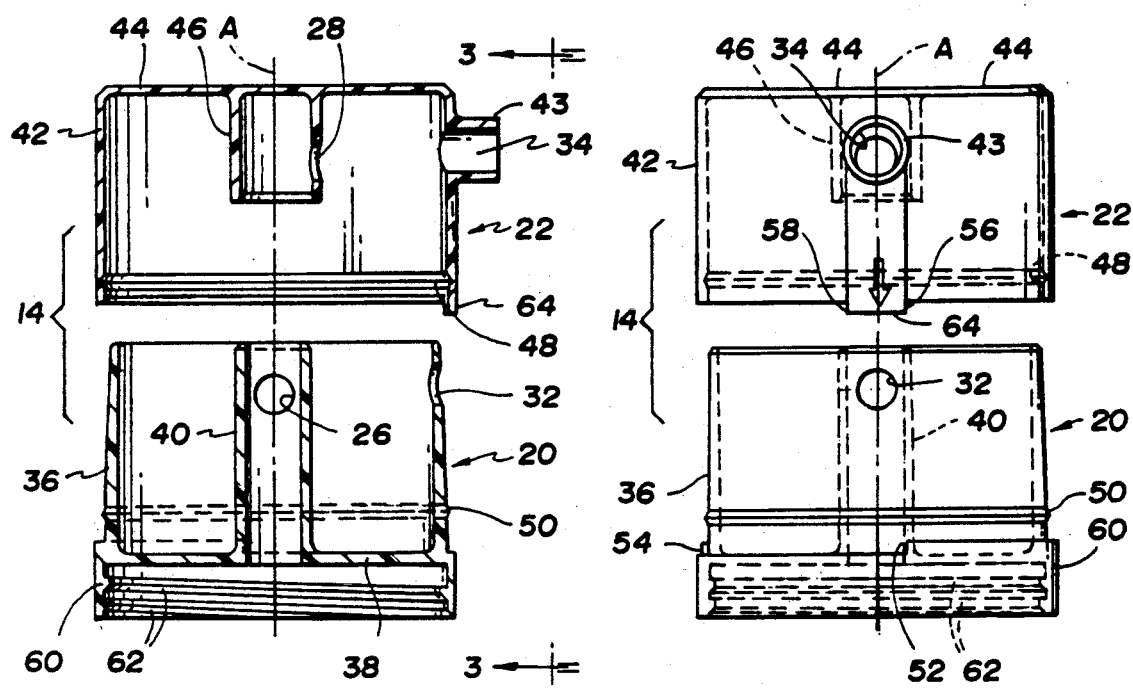
Fig. 2
Fig. 3
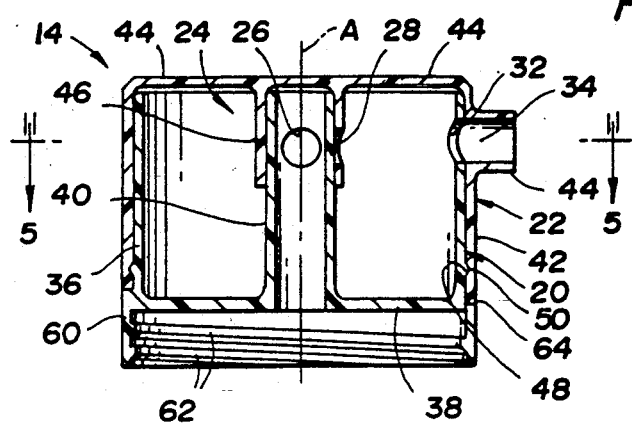
Fig. 4

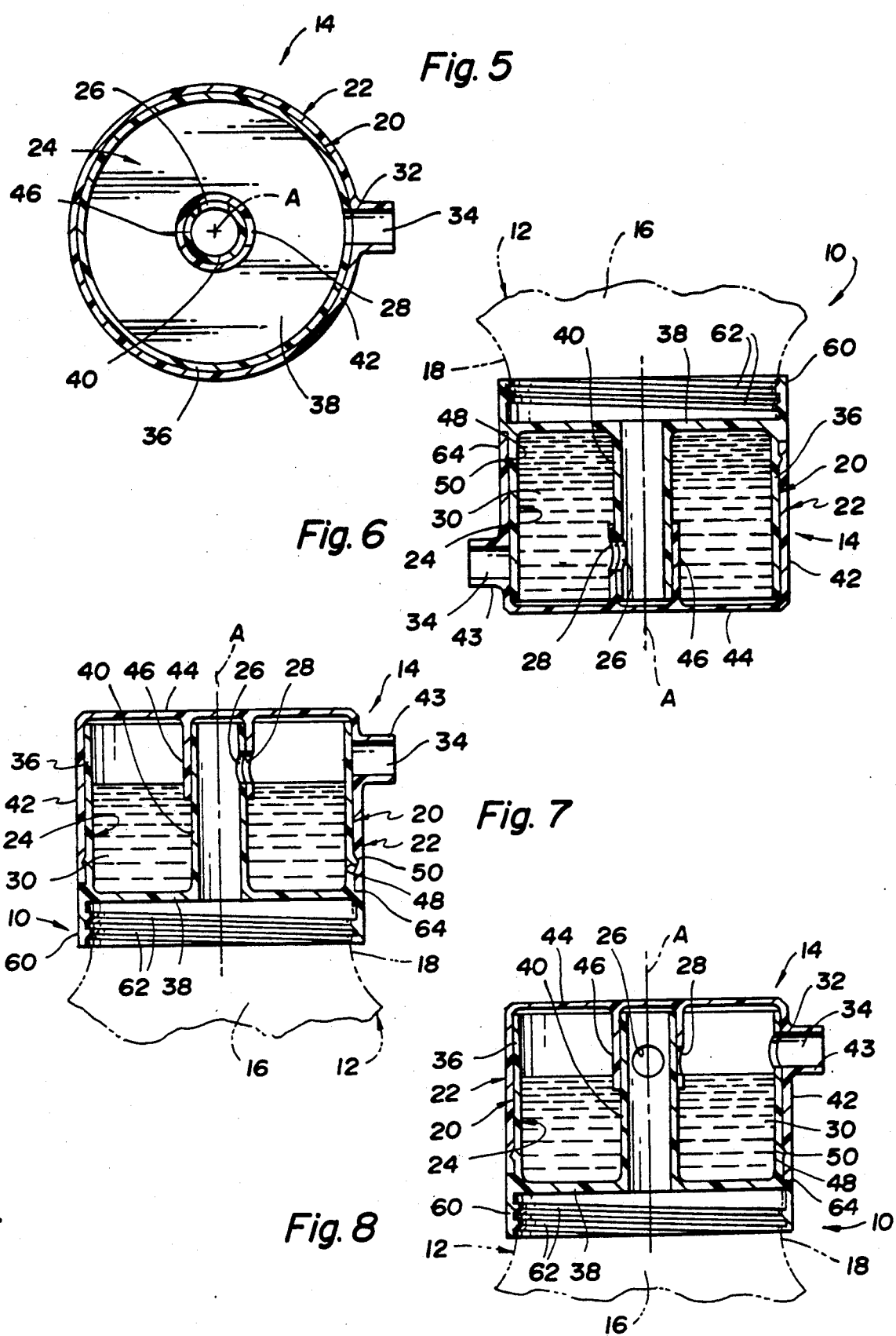

1

DISPENSING CLOSURE ASSEMBLY FOR PLASTIC BLOW MOLDED CONTAINER

TECHNICAL FIELD

This invention relates to a dispensing closure assembly for use with a plastic blow molded container.

BACKGROUND ART

Plastic blow molded containers conventionally include a body portion for holding liquid contents such as detergent and also have an upper open end through which the liquid contents can be dispensed. Prior to the last ten years or so, such containers conventionally included threads or other suitable retainers on the upper open end for securing a closure cap that is removable to permit the dispensing and thereafter secured by the retainers. Such closure caps cannot be easily utilized to provide measuring of the required amount of liquid contents since the liquid remaining in the closure cap will drip onto the container exterior upon subsequent securement by the retainers so that the container is disadvantageously messy.

More recently, drain-back closure assemblies have been developed to allow measuring with a cup-like closure that is secured to a plastic blow molded container by a drain-back member mounted on the upper open end of the container. Such drain-back closure assemblies allow the liquid remaining within the cup-like closure to drain back into the container after securement thereof to the drain-back member without dripping liquid onto the exterior of the container. Prior art patents which disclose such drain-back closures include U.S. Pat. Nos. 4,349,056 Heino; 4,550,862 Barker et al; 4,640,855 St. Clair; and 4,981,239 Coppel et al.

DISCLOSURE OF INVENTION

An object of the invention is to provide an improved dispensing closure assembly for use with a plastic blow molded container to provide dispensing of a measured amount of liquid contents.

In carrying out the above and other objects of the invention, a dispensing closure assembly constructed in accordance with the present invention is used with a plastic blow molded container having a body portion for holding liquid contents and an upper end through which the liquid contents can be dispensed. The dispensing closure includes a dispensing member that is adapted to be fixedly mounted on the upper open end of the blow molded container. A closure member of the closure assembly is rotatably mounted on the dispensing member for movement between fill and dispensing positions and cooperates therewith to define a hollow interior of the closure assembly. The dispensing member and closure member of the closure assembly each have an associated fill opening and the fill openings are aligned in the fill position of the closure member to permit liquid contents to flow from the container body portion into the hollow interior of the closure assembly with the container inverted. The fill openings are unaligned with each other in the dispensing position of the closure member to close the upper open end of the container. The dispensing member and closure member of the closure assembly each also have an associated dispensing opening and the dispensing openings are unaligned with each other with the closure member in the fill position so that the liquid contents received from the container body portion then remain within the interior of the closure assembly. The dispensing openings of the dispensing member and the closure member are aligned with each other in the dispensing position of the closure member to permit dispensing of liquid contents within the hollow interior of the closure assembly.

This improved construction of the dispensing closure assembly allows for dispensing of a measured amount of the liquid contents of the blow molded container without the necessity of removing the closure member as has previously been the case with drain-back closure assemblies of the prior art. The dispensing member includes an annular wall that projects upwardly from the blow molded container and defines the dispensing opening thereof, and the dispensing member also includes a bottom wall that closes the lower extremity of the annular wall of the dispensing member and includes an upwardly extending tube that defines the fill opening of the dispensing member. Furthermore, the construction of the dispensing closure assembly has the closure member constructed to include an annular wall that extends vertically and is supported for rotation between the fill and dispensing positions on the annular wall of the dispensing member in a liquid sealed relationship. This annular wall of the closure member defines the dispensing opening thereof which is illustrated as having a tubular construction. The closure member also includes a top wall that closes the upper extremity of the annular wall of the closure member and includes a downwardly extending tube that defines the fill opening of the closure member. The downwardly extending tube of the closure member and the upwardly extending tube of the dispensing member are slidably engaged with each other in a sealed relationship.

In its preferred construction, the dispensing closure assembly also has the annular wall of one of the members constructed to include an annular groove. Furthermore, the annular wall of the other member is constructed to include an annular rib that is received within the annular groove of the one member to maintain the closure member on the dispensing member while permitting the rotation thereof between the fill and dispensing positions.

The preferred construction of the dispensing closure assembly also has the dispensing member and the closure member constructed to include stop surfaces that limit the rotation of the closure member on the dispensing member between the fill and dispensing positions.

In the preferred construction, the dispensing closure assembly has the dispensing member constructed to include a lower mounting flange of an annular shape below the bottom wall of the dispensing member. This lower mounting flange of the dispensing member has an interior including retainers for providing mounting thereof on the blow molded container.

In the preferred construction, the dispensing closure assembly also has the dispensing member constructed to include an exterior that defines the stop surfaces thereof which are spaced with respect to each other about the axis about which the closure member rotates. The closure member of the preferred construction has a stop tab that defines the stop surfaces thereof and is located between the stop surfaces of the dispensing member so as to be engageable therewith to limit the rotation of the closure member on the dispensing member between the fill and dispensing positions.

The objects, features and advantages of the present invention are readily apparent from the following detailed description of the best mode for carrying out the invention when taken in connection with the accompanying drawings.

BRIEF DESCRIPTION OF DRAWINGS

FIG. 1 is a side elevational view of a plastic blow molded container package which includes a dispensing closure assembly constructed in accordance with the present invention;

FIG. 2 is an elevational sectional view taken in the same direction as FIG. 1 with a dispensing member and closure member of the closure assembly in an unassembled condition;

FIG. 3 is a front elevational view of the unassembled closure assembly taken along the direction of line 3—3 in FIG. 2;

FIG. 4 is an elevational sectional view through the assembled closure assembly taken in the same direction as FIG. 2;

FIG. 5 is a sectional plan view taken through the closure assembly along the direction of line 5—5 in FIG. 4;

FIG. 6 is a sectional view illustrating the dispensing closure assembly in an inverted position with its closure member in a fill position so that liquid contents from the associated blow molded container can fill the closure assembly;

FIG. 7 is a sectional view of the dispensing closure assembly after movement back from the inverted position of FIG. 6 to an upright position so that the liquid contents will drain to a predetermined level with the closure member still in the fill position; and FIG. 8 is an sectional view after movement of the closure member from the fill position to a dispensing position so that the measured contents within the closure assembly can be dispensed upon tipping of the container.

BEST MODE FOR CARRYING OUT THE INVENTION

With reference to FIG. I of the drawings, a plastic blow molded container package is generally indicated by 10 and includes a plastic blow molded container 12 on which is mounted a dispensing closure assembly 14 that is constructed in accordance with the present invention.

The blow molded container 12 includes a body portion 16 for holding liquid contents such as detergents, bleach etc. and also has an upper open end 18 on which the dispensing closure assembly 14 is fixedly mounted in a suitable manner as is hereinafter more fully described. The upper open end 18 of the container 12 allows for dispensing of the liquid contents of the container through the dispensing closure assembly 14 by providing a premeasured amount of contents.

With reference to FIGS. 2–4, the dispensing closure assembly 14 includes a dispensing member 20 that is adapted to be fixedly mounted on the upper open end of the blow molded container as is hereinafter more fully described. Dispensing closure assembly 14 also includes a closure member 22 rotatably mounted on the dispensing member 20 about an axis A for movement between fill and dispensing positions as is hereinafter more fully described. Dispensing member 20 and closure member 22 cooperate as shown in the assembled position of FIG. 4 to define a hollow interior 24 of the closure assembly.

As best illustrated in FIGS. 2 and 5, the dispensing member 20 has a fill opening 26 and the closure member 22 has a fill opening 28. These fill openings 26 and 28 are aligned with each other in the fill position of the closure member as shown in FIG. 6 to permit liquid contents 30 to flow from the container body portion into the hollow interior 24 of the closure assembly with the container inverted. The fill openings are unaligned with each other in the dispensing position of the closure member as shown in FIG. 8 to close the upper end of the container 12.

As illustrated in FIGS. 2–5, the dispensing member 20 of the closure assembly has an associated dispensing opening 32 and the closure member 22 has an associated dispensing opening 34. These dispensing openings 32 and 34 are unaligned with each other with the closure member 22 in the fill position of FIG. 6 so that the liquid contents 30 received from the container body portion then remain within the interior 24 of the closure assembly. Upon repositioning of the container 12 in its upright position of FIG. 7 and subsequent movement of the closure member 22 to the dispensing position of FIG. 8, the dispensing openings 32 and 34 are aligned with each other to permit dispensing of the liquid contents 30 within the hollow interior 24 of the closure assembly by tilting of the container.

A cycle of use of the container package 10 shown in FIG. 1 begins by moving the closure member 22 from the dispensing position of FIG. 5 to the fill position and then inverting the container 12 as shown in FIG. 6 so that the liquid contents 30 fill the hollow interior 24 by flowing through the aligned fill openings 26 and 28. Upon subsequent repositioning of the container 12 in its upright position shown in FIG. 7, the liquid contents 30 will drain partially back into the container body portion 16 by flow back through the aligned fill openings 26 and 28. In this connection, it should be noted that the fill openings 26 and 28 have lower extremities slightly below the lower extremities of the dispensing openings 32 and 34 so that upon subsequent movement of the closure member 22 to the dispensing position, the liquid contents will not flow out through the aligned dispensing openings 32 and 34 until the container 12 is tipped.

In an alternate method of use, the dispensing closure assembly 14 can be inverted in the same manner previously described in connection with FIG. 6 and remain inverted as the closure member 22 is rotated from the fill position illustrated to the dispensing position to align the dispensing openings and then dispense the greater volume of liquid contents 30 without the draining upon repositioning in the upright position as shown in FIG. 7 as previously described. This alternate method of use will provide a greater volume of dispensed liquid contents 30 since there is no draining when the container 12 remains inverted during the dispensing.

Regardless of which way the container is to be used, the components of the closure can be sized and constructed to provide a predetermined dosage of the liquid contents of the container.

The dispensing closure assembly 14 as illustrated in FIGS. 2–4, has the dispensing member 20 constructed to include an annular wall 36 that projects upwardly from the blow molded container and defines the dispensing opening 32 of the dispensing member adjacent its upper extremity. Dispensing member 20 also includes a bottom wall 38 that closes the lower extremity of the annular wall 36 of the dispensing member and includes an upwardly extending tube 40 that defines the fill opening 26 of the dispensing member.

The dispensing closure assembly 14 has the closure member 22 constructed to include an annular wall 42 that extends vertically and is supported for rotation between the fill and dispensing positions on the annular wall 36 of the dispensing member in a liquid sealed relationship. This annular wall 42 of the dispensing member 22 defines the dispensing opening 34 which is illustrated as being provided by a spout 43. Closure member 22 further includes a top wall 44 that closes the upper extremity of the annular wall 42 of the closure member. This top wall 44 includes a downwardly extending tube 46 that defines the fill opening 28 of the closure member. The downwardly extending tube 46 of the closure member 22 and the upwardly extending tube 40 of the dispensing member 20 are slidably engaged with each other in a fluid sealed relationship with the fill openings 26 and 28 thereof positioned for movement into the aligned relationship upon positioning of the closure member in the fill position shown in FIGS. 6 and 7 and out of alignment with each other in the dispensing position shown in FIG. 8.

In the preferred construction of the dispensing closure assembly 14, the annular wall of one of the members 20, 22, specifically the closure member 22 as illustrated, includes an annular groove 48 and the other member 20, 22, which is specifically illustrated as the dispensing member 20, includes an annular rib 50 that is received within the annular groove 48 of the one member to maintain the closure member 22 on the dispensing member 20 while permitting the rotation thereof between the fill and dispensing positions previously described. Thus, the closure member 22 is moved downwardly from the position illustrated in FIGS. 2 and 3 to the position of FIG. 4 where a snap action occurs as the groove 48 receives the rib 50 and cooperates with the annular walls of these members in providing a fluid tight seal while still permitting the rotation.

As best illustrated in FIG. 3, the dispensing member 20 and the closure member 22 include stop surfaces 52, 54, 56, 58 that limit rotation of the closure member on the dispensing member between the fill and dispensing positions. More specifically, the stop surface 52 on the dispensing member 20 and the stop surface 56 on the closure member 22 are engaged with each other to limit rotation of the closure member in one direction, while the stop surface 54 on the dispensing member and the stop surface 58 on the closure member are engaged to limit rotation of the closure member in the other direction.

As illustrated in FIGS. 2-4, the dispensing member 20 includes a lower mounting flange 60 of an annular shape below the bottom wall 38 of the dispensing member. This lower mounting flange 60 has an interior including retainers 62 such as threads or the like for providing a fixed mounting thereof on the blow molded container such as by threading onto mating male threads on the upper open end 18 of the container 12.

The preferred construction of the dispensing member 20 as illustrated in FIG. 3 has an exterior that provides the stop surfaces 52 and 54 thereof which are spaced with respect to each other about the axis A around which the closure member 22 rotates on the dispensing member 20 which is about the tubes 40 and 46. Furthermore, the closure member 22 preferably includes a stop tab 64 that defines the stop surfaces 56 and 58 thereof to limit the rotation of the closure member on the dispensing member between the fill and dispensing positions by engagement of the associated pairs of stop surfaces 52, 56 and 54, 58 as previously described.

While the best mode for carrying out the invention has been described in detail, those familiar with the art to which this invention relates will recognize various alternative designs and embodiments for practicing the invention as defined by the following claims.

What is claimed is:

1. A dispensing closure assembly for use with a plastic blow molded container having a body portion for holding liquid contents and an upper open end through which the liquid contents can be dispensed, the dispensing closure assembly comprising: a dispensing member that is adapted to be fixedly mounted on the upper open end of the blow molded container; the dispensing member including an annular wall that projects upwardly from the blow molded container and defines a dispensing opening; the dispensing member also including a bottom wall that closes the lower extremity of the annular wall of the dispensing member and includes an upwardly extending tube that defines a fill opening of the dispensing member; a closure member rotatably mounted on the dispensing member for movement between fill and dispensing positions and cooperating therewith to define a hollow interior of the closure assembly; the closure member including an annular wall that extends vertically and is supported for rotation between the fill and dispensing positions on the annular wall of the dispensing member in a liquid sealed relationship; the annular wall of the closure member defining a dispensing opening; the closure member also including a top wall that closes the upper extremity of the annular wall of the closure member and includes a downwardly extending tube that defines a fill opening of the closure member; the downwardly extending tube of the closure member and the upwardly extending tube of the dispensing member being slidably engaged with each other in a liquid sealed relationship; the fill openings of the dispensing member and the closure member being aligned in the fill position of the closure member to permit liquid contents to flow from the container body portion into the hollow interior of the closure assembly with the container inverted; the fill openings of the dispensing member and the closure member being unaligned with each other in the dispensing position of the closure member to close the upper open end of the container; the dispensing openings of the dispensing member and the closure member being unaligned with each other with the closure member in the fill position so that the liquid contents received from the container body portion thus remain within the interior of the closure assembly; and the dispensing openings of the dispensing member and the closure member being aligned with each other in the dispensing position of the closure member to permit dispensing of liquid contents within the hollow interior of the closure assembly.

2. A dispensing closure assembly as in claim 1 wherein the annular wall of one of the members includes an annular groove, and the annular wall of the other member including an annular rib that is received within the annular groove of the one member to maintain the closure member on the dispensing member while permitting the rotation thereof between the fill and dispensing positions.

3. A dispensing closure assembly as in claim 2 wherein the dispensing member and the closure member include stop surfaces that limit the rotation of the closure member on the dispensing member between the fill and dispensing positions.

4. A dispensing closure assembly as in claim 3 wherein the dispensing member includes a lower mounting flange of an annular shape below the bottom wall thereof, and the lower mounting flange having an interior including retainers for providing mounting thereof on the blow molded container.

5. A dispensing closure assembly as in claim 4 wherein the dispensing member has an exterior that defines the stop surfaces thereof which are spaced with respect to each other about the axis about which the closure member rotates, and the closure member including a stop tab that defines the stop surfaces thereof and is located between the stop surfaces of the dispensing member so as to be engageable therewith to limit the rotation of the closure member on the dispensing member between the fill and dispensing positions.

6. A dispensing closure assembly for use with a plastic blow molded container having a body portion for holding liquid contents and an upper open end through which the liquid contents can be dispensed, the dispensing closure assembly comprising: a dispensing member that is adapted to be fixedly mounted on the upper open end of the blow molded container; the dispensing member including an annular wall that projects upwardly from the blow molded container and defines a dispensing opening thereof; the dispensing member also including a bottom wall that closes the lower extremity of the annular wall of the dispensing member and includes an upwardly extending tube that defines a fill opening of the dispensing member; a closure member that cooperates with the dispensing member to define a hollow interior of the closure assembly; the closure member including an annular wall that extends vertically and is supported for rotation between fill and dispensing positions on the annular wall of the dispensing member in a liquid sealed relationship; the annular wall of the closure member defining a dispensing opening thereof; the closure member also including a top wall that closes the upper extremity of the annular wall of the closure member and includes a downwardly extending tube that defines a fill opening of the closure member; the downwardly extending tube of the closure member and the upwardly extending tube of the dispensing member being slidably engaged with each other in a liquid sealed relationship; the fill openings of the dispensing member and closure member of the closure assembly being aligned with each other in the fill position of the closure member to permit liquid contents to flow from the container body portion into the hollow interior of the closure assembly with the container inverted; the fill openings being unaligned with each other in the dispensing position of the closure member to close the upper open end of the container; the dispensing openings of the dispensing member and closure member of the closure assembly being unaligned with each other with the closure member in the fill position so that the liquid contents received from the container body portion then remain within the interior of the closure assembly; the dispensing openings of the dispensing member and the closure member being aligned with each other in the dispensing position of the closure member to permit dispensing of liquid contents within the hollow interior of the closure assembly; and the dispensing member and the closure member including stop surfaces that limit the rotation of the closure member on the dispensing member between the fill and dispensing positions.

7. A dispensing closure assembly for use with a plastic blow molded container having a body portion for holding liquid contents and an upper open end through which the liquid contents can be dispensed, the dispensing closure assembly comprising: a dispensing member including a lower mounting flange of an annular shape having an interior including retainers that are adapted to fixedly mount the dispensing member on the upper open end of the blow molded container; the dispensing member including an annular wall that projects upwardly from the blow molded container and defines a dispensing opening thereof; the dispensing member also including a bottom wall that closes the lower extremity of the annular wall of the dispensing member and includes an upwardly extending tube that defines a fill opening of the dispensing member; the dispensing member having an exterior that defines stop surfaces thereof that are spaced with respect to each other about the upwardly extending tube; a closure member that cooperates with the dispensing member to define a hollow interior of the closure assembly; the closure member including an annular wall that extends vertically and is supported for rotation between fill and dispensing positions on the annular wall of the dispensing member in a liquid sealed relationship; the annular wall of the closure member defining a dispensing opening thereof; the closure member also including a top wall that closes the upper extremity of the annular wall of the closure member and includes a downwardly extending tube that defines a fill opening of the closure member; the downwardly extending tube of the closure member and the upwardly extending tube of the dispensing member being slidably engaged with each other in a liquid sealed relationship; the fill openings of the dispensing member and closure member of the closure assembly being aligned with each other in the fill position of the closure member to permit liquid contents to flow from the container body portion into the hollow interior of the closure assembly with the container inverted; the fill openings being unaligned with each other in the dispensing position of the closure member to close the upper open end of the container; the dispensing openings of the dispensing member and closure member of the closure assembly being unaligned with each other with the closure member in the fill position so that the liquid contents received from the container body portion then remain within the interior of the closure assembly; the dispensing openings of the dispensing member and the closure member being aligned with each other in the dispensing position of the closure member to permit dispensing of liquid contents within the hollow interior of the closure assembly; the closure member including a stop tab that defines stop surfaces thereof located between the stop surfaces of the dispensing member so as to be engageable therewith to limit the rotation of the closure member on the dispensing member between the fill and dispensing positions; the annular wall of one of the members including an annular groove; and the annular wall of the other member including an annular rib that is received within the annular groove of the one member to maintain the closure member on the dispensing member while permitting the closure member movement between the fill and dispensing positions.

* * * * *